Oct. 26, 1943.    C. S. DRAPER ET AL    2,332,994
ACCELERATION MEASURING DEVICE
Filed Sept. 25, 1940    2 Sheets—Sheet 1

INVENTORS
CHARLES S. DRAPER, WALTER WRIGLEY,
BY
Herbert Thompson
ATTORNEY

Oct. 26, 1943.                C. S. DRAPER ET AL                2,332,994
                            ACCELERATION MEASURING DEVICE
                        Filed Sept. 25, 1940        2 Sheets-Sheet 2
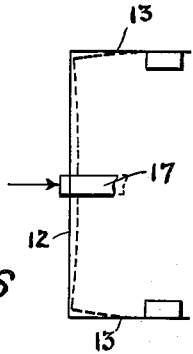
FIG. 6
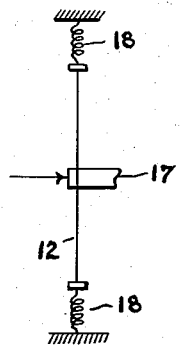
FIG. 7
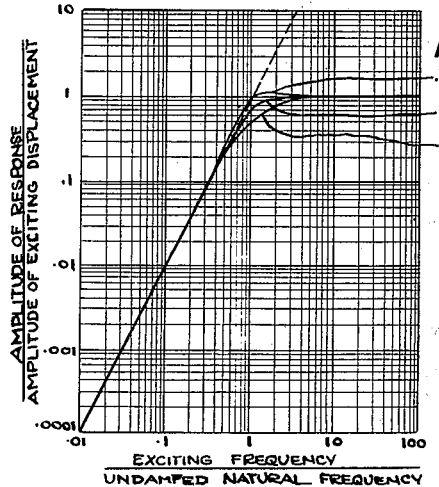
FIG. 8
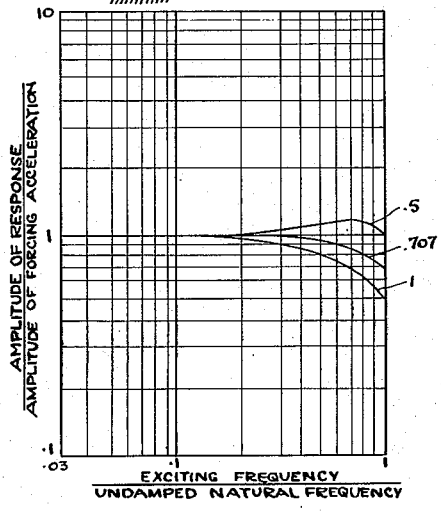
FIG. 9
FIG. 10
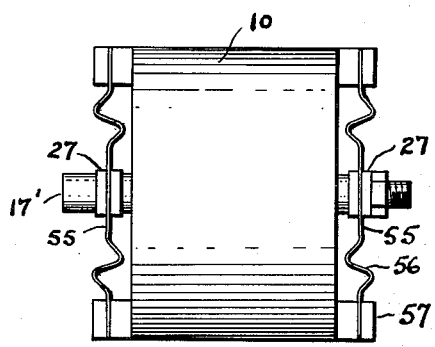
FIG. 11
INVENTORS
CHARLES S. DRAPER, WALTER WRIGLEY,
BY
ATTORNEY.

Patented Oct. 26, 1943

2,332,994

UNITED STATES PATENT OFFICE 2,332,994

ACCELERATION MEASURING DEVICE

Charles S. Draper, Newton, Mass., and Walter Wrigley, Hempstead, N. Y., assignors to Sperry Gyroscope Company, Inc., Brooklyn, N. Y., a corporation of New York Application September 25, 1940, Serial No. 358,266

11 Claims. (Cl. 73—51)

This invention relates to instruments for measuring quantities characteristic of the motion of an object, such as displacement, velocity and acceleration, and it refers more particularly to instruments of the above classification which are adapted to measure both constant and periodically varying quantities either independently or in combination. A field in which kinematic measurements of the above type are of special importance is the study of the motion of wings and control surfaces of aircraft, which are subject to low frequency vibration in the presence of superposed high amplitude displacements.

Instruments for measuring vibratory motions and strains have been developed which are suitable for the measurement of vibrations occurring at a relatively high frequency, but such instruments cannot be used for measuring extremely low frequency vibrations and in many cases are not adapted to measure the characteristics of vibratory movement in the presence of large steady displacements.

The motion of aircraft wings and control surfaces produced by air currents, maneuvers or flutter conditions often involves frequency components which are below the limit of satisfactory operation for conventional instruments designed to measure vibratory displacements or velocities. A further difficulty encountered is that substantially steady displacements having amplitudes of several inches may accompany such motions, so that a self-contained instrument designed to measure the vibratory displacements directly would have to be excessively large to handle these steady components and even then would be unable to make such measurements when the vibratory displacements are superposed upon the high amplitude displacements to which airplane surfaces are subjected during maneuvering of the craft.

Measurements of vibratory displacements are simple when a stationary reference point is available near the subject member whose motion is to be studied. It is only necessary to provide a means for indicating or recording the relative motion between the reference point and the subject member in order to study vibratory motion of this member. When a reference point such as a fixed bench or wall is available and the vibratory frequency is not too high, the required apparatus need be no more complicated than the conventional dial gage. A non-vibrating point is usually not available when measurements are to be carried out on aircraft, so that any instrument intended for such use must operate without an external reference. The self-contained devices which have been found satisfactory for measuring vibratory displacements, velocities or accelerations have been of the seismographic type, so called from their similarity to the instruments for studing earth tremors.

Reduced to its elements, a seismographic system consists of a mass which will be called the "seismic" or inertia element, connected by means of an elastic coupling and a damper to the member whose motion is to be observed. When the spring and damper are so weak that no vibration is transmitted through the coupling system, the seismic element can be used as the reference point for measuring vibratory displacements. When the force due to the damper is proportional to the relative velocity of the seismic element and has the proper relationship with respect to the inertia and elastic forces, the relative displacement between the seismic element and the subject member will be proportional to the velocity of the latter. Finally, when the force due to the elastic coupling is large compared to the inertia and damping forces, the relative displacement between the seismic element and the subject member will be a measure of the acceleration of this member. These facts are known and have been discussed mathematically in the literature.

An object of the present invention is to provide a spring support for sensitive instruments in general and, more particularly, for instruments of the above character, which is free from sliding or "coulomb" friction, which readily allows small displacements to take place in a desired direction under small applied forces, and which permits a linear response of the sensitive element in such desired direction over a wide range of values of the applied force while providing sufficiently rigid restraint against displacement of the sensitive element in undesired directions.

Another object is to provide a compact instrument capable of measuring high amplitude, low frequency vibrations.

Another object is to increase the operating range of such an instrument by providing suitable damping.

Another object is to provide in such an instrument desirable damping characteristics by a combination of shear in thin oil films and positive oil displacement.

Still another object is to control the damping of such an instrument in such a way that the instrument indications are independent of the temperature of the damping fluid.

Yet another object of the invention is to convert the response of such an instrument into an electrical indication which may be readily amplified and used to give a convenient visual indication or made to yield a permanent record, as on photographic film.

Referring to the drawings,

Figs. 6 and 7 are illustrative diagrams relating to spring suspensions.

Figs. 8 and 9 are diagrams illustrating instrument characteristics.

Fig. 10 is a diagram of a circuit suitable for use with measuring instruments according to the present invention.

Fig. 11 illustrates a modified spring suspension.

Figure 1:
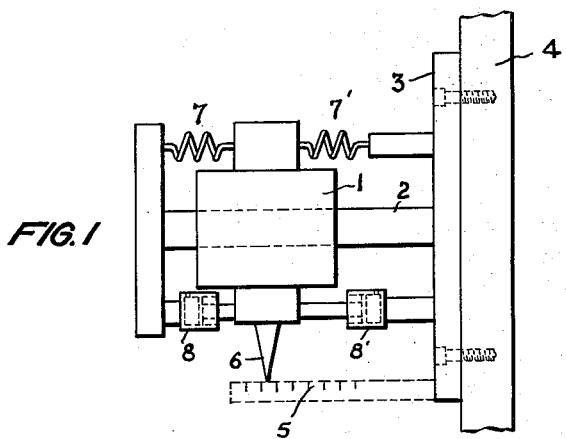
Fig. 1 is a diagrammatic representation of an instrument of the type to which the invention pertains.

Referring now to Fig. 1, an inertia element or seismic mass 1 is shown slidably mounted on rod 2 rigidly supported by instrument frame 3 to form an instrument of the seismic type, the relatively movable elements of which have a single degree of freedom in a direction along the axis of rod 2. Frame 3 is attached to a subject member 4 whose motional characteristics it is desired to determine.

The position of seismic mass 1 along rod 2 relative to the instrument frame 3 is indicated by an index 6 readable on a scale 5 rigidly attached to frame 3. The displacement, velocity and acceleration of subject member 4 are communicated to frame 3 of the measuring instrument. The position of seismic mass 1 relative to this frame, as indicated on scale 5, depends upon the inertia of mass 1, the elastic reaction of springs 7, 7' located between mass 1 and frame 3, the damping represented by dash-pots 8, 8', and any other friction which may oppose motion between mass 1 and frame 3.

The solution of the differential equation representing the motion of seismic mass 1 relative to frame 3 is well known. In order that the response of an instrument of the type illustrated in Fig. 1 may be of value for measurement purposes, it is essential in most cases that the friction between seismic mass 1 and its supporting frame be reduced to a very small value. This is especially important when a small response is to be expected while at the same time the instrument is subjected to large accelerations in directions at right angles to the axis of rod 2. In this case the friction acting to retard relative motion between the seismic mass and the frame will be greatly increased, and if the acceleration of the seismic mass along the axis of the rod is less than that required to overcome the opposing friction, no relative motion will take place and the instrument will fail to indicate.

When the friction factor has been reduced to a negligibly small value, the instrument will have a natural, undamped frequency of vibration which will depend only upon the ratio of the mass of the seismic element to the stiffness of the springs 7, 7'. The solution of the equation of motion may then be considered in two parts, free vibration and forced vibration.

In the case of free vibration, without damping, the instrument continues to vibrate indefinitely at its characteristic natural frequency after an initial impulse is applied to the movable element. With slight damping, the response is a damped sine wave. Critical damping is reached when the movable element, upon displacement, just returns to its position of rest without oscillation. No oscillations at its natural frequency are present in the instrument response for damping greater than this critical value.

In the case of forced vibration, an additional response at the forcing frequency is superposed on the free vibration response, if any, of the instrument.

Seismic instruments of the type illustrated in Fig. 1 function as displacement-measuring devices or "vibrometers" when the lowest frequency to be recorded is not less than twice the natural frequency of the instrument for a damping ratio of .5 to .8 critical damping. In order to use such instruments as accelerometers, the maximum frequency to be measured must be considerably lower than the natural frequency of the instrument and to adapt the instrument for making measurements over a wide range of frequencies, the amount of damping must be controlled.

If a variation of plus or minus five per cent is allowed in the response of an instrument used as an accelerometer, the instrument is usable without damping at frequencies up to about 0.2 of its natural frequency. With critical damping the upper limit of frequency is also about 0.2 of the natural frequency. A damping ratio of 0.7 of critical damping extends the upper range of operation to a frequency corresponding to about 0.6 of the undamped natural frequency, while for 0.6 critical damping the upper range is extended to about 0.8 of the undamped natural frequency.

It might be assumed that the range of an accelerometer could be indefinitely extended by merely increasing the natural frequency of the instrument. However, a practical limitation is soon reached because the sensitivity of such an instrument varies inversely as the square of its natural frequency. As a consequence of this relation, instruments having a low natural frequency and yet able to cover a large frequency range require careful design.

Figure 2:
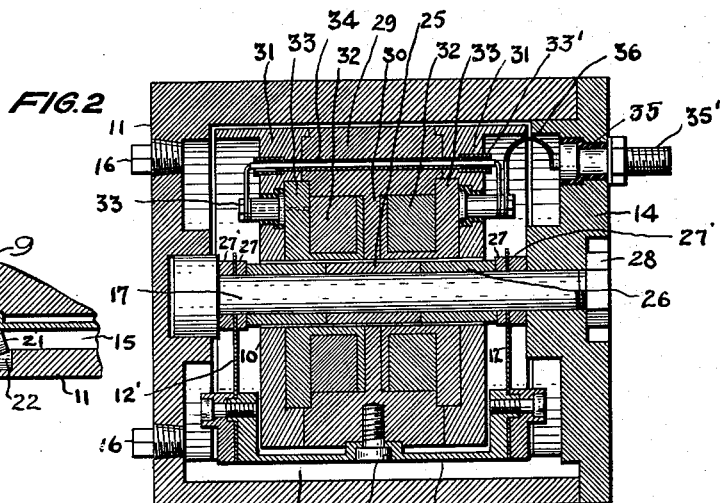
Fig. 2 is a section along the line 2—2 of Fig. 5, showing a preferred construction of an instrument embodying the present invention.
Figure 5:
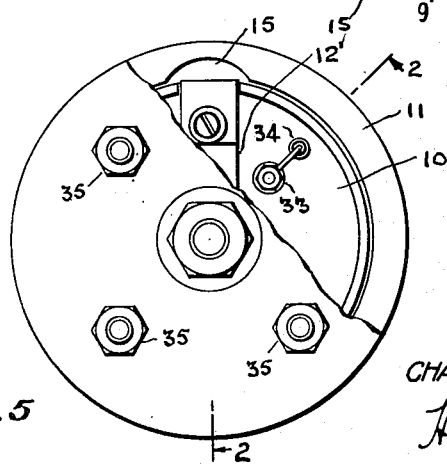
Fig. 5 is an end elevation of the instrument shown in section in Fig. 2, viewed from the right, with a portion of the end plate cut away.

Referring now to Fig. 2, there is represented as a section along the line 2—2 of Fig. 5 a preferred construction in accordance with the invention which is particularly applicable to instruments of the accelerometer type. A seismic mass 10 of cylindrical form, comprising a body portion together with coils and other elements mounted thereon as hereinafter described, is supported within cylindrical case 11, of duralumin or other light metal, so as to provide small radial clearances between adjacent cylindrical surfaces, by means of leaf springs 12, 12' extending diametrically across case 11 and clamped at their centers to axially positioned stud 17 rigidly mounted at one end on end plate 14 of case 11 and slidably engaging a recess in the case at the other end. Springs 12, 12' are rigidly clamped at each end to a free end of one of cantilever springs 13, fixed at their centers to seismic mass 10, in the median plane thereof, by screws 9. Cantilever springs 13 are located within recessed channels 15 in the inner wall of cylindrical case 11. In use, case 11 is filled with oil or other damping liquid of suitable viscosity and temperature characteristics through plugs 16 located in the end wall of case 11.

Springs 12, 12' preferably consist of thin strips of a material such as beryllium copper or tempered steel which exhibits a low degree of mechanical hysteresis when subjected to the small bending forces occasioned by small axial displacements of seismic mass 10, thereby enabling the instrument to respond accurately to very small axial accelerations. If springs 12, 12' were clamped so that the two ends of each spring were rigidly supported a fixed distance apart, then large displacements of mass 10 would tend to place the springs under considerable tension and, if made of material thin enough to be sensitive to small applied axial forces, they would be ruptured upon the application of larger forces. By yieldingly supporting the ends of springs 12, 12' through their attachment to the ends of cantilever springs 13, which may be made of steel and which are free to deflect in a direction perpendicular to the deflection of 12, 12', the range of axial displacements of mass 10 relative to case 11 is greatly increased. The spring deflection associated with large axial displacements is represented diagrammatically in Fig. 6, while Fig. 7 shows an equivalent spring suspension in which cantilever springs 13 have been replaced by coil springs 18 of equivalent stiffness. It will be seen that in the construction illustrated in Fig. 7 the spring loading for small deflections is due principally to the bending of spring 12 as a shallow beam, while as the deflections increase, spring 12 tends to act as a tension member to elongate springs 18, which then furnish the principal loading. Similarly, in the cantilever spring construction of Fig. 6, which diagrammatically represents the spring structure of Figs. 2 and 5, after the initial yielding of spring 12, increasing bending of cantilever 13 takes place and in the practical form shown in Figs. 2 and 5, by suitable choice of the sections and materials for these two springs, thereby adjusting their relative stiffness, a uniformly increasing resistance to increasing relative displacement of stud 17 and seismic mass 10 may be offered from the lowest to relatively high values.

The spring suspension of Fig. 2 offers considerable rigidity to radial displacements. In a longitudinal direction along springs 12, 12', a displacement of mass 10 places these springs in tension, which they are well able to resist. Due to the load applied by springs 12, 12', cantilever springs 13 are slightly deflected toward the axis. The cantilever springs, however, are made stiff enough so that under normal operating conditions their deflections are not sufficiently large to cause undesired contact between mass 10 and case 11 or the assembly on rod 17 mounted on end plate 14. In a radial direction transverse to springs 12, 12', the spring assembly is designed to have a stiffness comparable to that in a radial direction along these springs.

The spring suspension of Fig. 2 is also well able to resist shocks in radial directions. The radial clearance between seismic mass 10 and case 11 with parts mounted thereon is very small, in a preferred design being of the order of .008 inch. Such a small annular space filled with oil provides a film which is well able to resist deformation caused by suddenly applied radial loads.

In the case of response in the desired axial direction, motion between seismic mass 10 and case 11 is resisted by shear in the oil film in the annular space between these members, and in addition there is positive displacement of oil from one end of case 11 to the other, the flow of oil taking place mostly through recessed channels 15. Energy is thus absorbed by the oil in two ways and this absorption of energy introduces the damping factor necessary for the proper operation of the instrument. It will be noted that only viscous damping occurs since there are no relatively slidable parts to produce "coulomb" friction.

In the diagram of Fig. 8, showing calculated characteristics, abscissae represent the ratio $$\frac{\text{Exciting frequency}}{\text{Undamped natural frequency}}$$

i. e., the closeness of the exciting frequency to the natural frequency of the seismographic system, and ordinates $$\frac{\text{Amplitude of response}}{\text{Amplitude of exciting displacement}}$$

i. e., the relative response. The term "response" as used here is the relative displacement of the seismic mass and end plate. On a logarithmic scale, the response curve of a perfect accelerometer would be a straight line having a slope of 2, as indicated by the dotted line. Response curves are plotted for damping ratios of 1, .707 and .5, the damping ratio being defined as the ratio $$\frac{\text{Actual damping}}{\text{Critical damping}}$$

By interpolation it may be observed that an accelerometer having a damping ratio of .6 would give substantially accurate indications up to a frequency of approximately 0.8 the natural undamped frequency of the instrument.

In Fig. 9, also showing calculated characteristics, abscissae are the same ratio of frequencies as in Fig. 8, while ordinates represent $$\frac{\text{Amplitude of response}}{\text{Amplitude of forcing acceleration}}$$

i. e., the sensitivity of the instrument. The sensitivity characteristic of an ideal accelerometer would be a horizontal line having an ordinate equal to 1. Curves are plotted for damping ratios of 1, .707 and .5. By interpolation it may be observed that a damping ratio of about 0.6 would give a characteristic approaching that of the ideal instrument over the useful frequency range.

Figure 3:
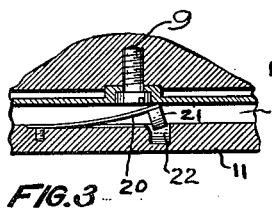
Fig. 3 is a sectional detail illustrating a modification of the invention.

Once a suitable damping ratio has been obtained for an instrument as determined chiefly by the selection of suitable radial clearances together with the use of an oil of suitable viscosity, the graphs of Figs. 8 and 9 indicate that it is highly desirable to maintain this damping factor at the desired value. Oils and other suitable damping liquids are known to decrease in viscosity with increasing temperature, and such a lowering of viscosity decreases the damping factor. In order to make the instrument indications independent of temperature changes, according to the invention an adjustable obstruction to the flow of oil through recessed channels 15 is introduced, as indicated in Fig. 3.

Figure 4:
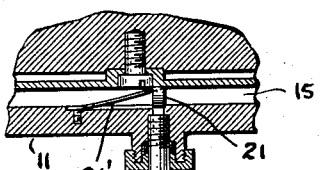
Fig. 4 is a sectional detail illustrating another modification of the invention.

A bimetallic thermostatic strip 20 is fixed at one end to case 11 in a channel 15, or similar strips may be used in a plurality of such channels, so that an increase in oil temperature causes the strip to curl and thereby draw a gate 21 more or less into channel 15 from a recess 22 in the wall of case 11. The obstruction thus introduced to the passage of oil in channel 15 increases the damping factor of the instrument and may be designed to counteract the decrease in damping caused by a rise in temperature and associated drop in viscosity of the oil. Fig. 4 illustrates a manual adjustment designed to accomplish the same result by means of a screw 23 threaded into the wall of case 11 and passing through a stuffing box 24 which acts on gate 21, loaded by spring 21', the spring in this case not being temperature sensitive.

As a result of proper damping and by virtue of the type of sensitive spring suspension employed, the instrument of Fig. 2, when used as an accelerometer, may be caused to respond in a manner such that the displacement of seismic mass 10 relative to case 11 is proportional to the acceleration to which case 11 is subjected over a wide range of frequencies. To obtain indications at a distant point and to be able to amplify the response to obtain suitable indicator readings, the present invention utilizes a converter to change the response of the pick-up instrument into an electrical quantity which may readily be amplified and made to actuate either visual indicators for observation or recorders.

In Fig. 2 axial stud 17 is made of non-magnetic material and carries a centrally located armature sleeve 25 of magnetic material, such as iron or a high permeability ferrous alloy. Armature sleeve 25 is centrally spaced by means of non-magnetic sleeve spacers 26 and washers 27, 27', the springs 12, 12' being clamped between washers 27, 27' when stud 17 is mounted on end plate 14 by means of a nut 28.

The seismic mass 10 is composed of a central section of magnetic material including an annular portion 29 and a web 30 having a central opening. Disc-shaped closure members 31 of magnetic material and having central openings are mounted at each end of annular member 29. Coils 32, supported on a non-magnetic coil support 33, are mounted one on each side of web 30 in the space between the web and a disc closure member 31. The two coils 32 are almost completely surrounded by magnetic material including annular member 29 and the end discs 31, thus effectively shielding the coils from external magnetic fields.

The magnetic flux linked with coils 32 passes through annular member 29, web 30 and armature sleeve 25; where the flux divides between two paths and passes to closure discs 31 and returns to member 29. The reluctances of the two magnetic circuits thus formed are controlled to a large extent by the length of the non-magnetic gaps between armature sleeve 25 and the end closure discs 31. The normal unoperated position of seismic mass 10 within case 11 is preferably adjusted so that the reluctances of these magnetic circuits associated with the two coils 32 are substantially equal. In operation, the instrument response will cause the reluctance of one circuit to decrease, by decreasing the distance between armature sleeve 25 and closure disc 31, resulting in an increase of impedance of the associated coil while the reluctance of the other circuit is caused to increase, resulting in a decrease in the impedance of its associated coil.

The coil terminals may be brought out of the seismic element through an insulated bushing 33' in end disc 31, and through an insulated sleeve 34 in annular member 29, and may be brought out of the instrument through an insulated bushing 35 in end plate 14 to a terminal 35', a spring strip of conducting material 36 in the form of a loop allowing for the relative motion between seismic mass 10 and case 11. The position of the coil terminals is indicated in Fig. 5.

Referring now to Fig. 10, a circuit suitable for use with the described instrument is shown in which the two coils 32 are shown connected as two arms of an impedance bridge. In general, the ratio of inductance to resistance is not the same for each of the two coils in an instrument, and a variable resistance 40 is inserted in series with one of the coils 32 in the bridge circuit to equalize this ratio. When the two coils are thus equalized, the bridge can be balanced by a proper setting of the resistance ratio arms. These ratio arms are formed by main resistances 41, 41' shunted by high resistances 42, 42'. An adjustable resistance 43 is inserted in series with one of the resistances 41, 41', for instance 41', as an initial adjustment to compensate for variation of resistors 41 and 41'.

An alternating current source of substantially constant voltage and frequency is connected to bridge points 44, 44' of the circuit, a relatively high frequency being desirable for this supply to increase the sensitivity of the circuit. A frequency of 600 cycles per second has been successfully used for certain applications. The output of the bridge is taken from points 45 and 45', adjustable along resistances 46 and 46', respectively. Resistance 46 is connected in series with and between the ratio arms, while resistance 46' is in series with and between the instrument arms of the bridge. By means of an electrical connection between the two adjusting sliders, point 48 on resistance 47 is placed at the same potential as point 45 on resistance 46. A double adjustment of the lower bridge point, either along resistor 46 or 47, is thereby provided for convenience in balancing and unbalancing the circuit.

The slider determining point 48 on resistance 47 is an independent adjustment and is normally used to adjust the ratio arms in the same ratio as the impedances of the instrument arms, that is, as a balancing adjustment. Since it is desirable, however, to indicate the sense of the quantity being measured, for example, acceleration, after the bridge is balanced the two sliders determining points 45 and 45', which are mechanically connected as indicated by the dotted line, are moved together to unbalance the bridge so that accelerations of opposite sign, which if measured from the balance point would be indistinguishable from one another without phase sensitive circuits, are indicated as an increase or a decrease of the output reading. The values of the windings of resistances 46 and 46' per inch are such that as the sliders determining points 45 and 45' are moved together, the change of potentials along these two resistances results in an unbalance voltage of the same phase angle as would be occasioned by a movement of seismic mass 10 relative to case 11. That is, simultaneous change of points 45 and 45' simulates a response of the instrument.

In operation, the bridge circuit is first balanced by adjusting resistor 40 and the position of point 48 along resistance 47, and then unbalanced by the simultaneous movements of points 45 and 45' to an extent corresponding to an acceleration or other quantity somewhat greater than the maximum which is to be recorded. In use, therefore, the output of the bridge never passes through the electrical balance point and ambiguity in the readings is thus avoided. The bridge output is shown as connected to an indicator 50 coupled to the bridge circuit by input transformer 51. It is to be understood that this indicator 50 may include suitably connected meters or recording instruments as well as an amplifier to amplify the bridge output.

Referring to Fig. 11, there is shown a modification of the spring suspension of seismic mass 10. This mass is shown as suspended by springs 55 formed from strip stock, the springs being clamped to axial stud 17' corresponding to stud 17 of Fig. 2. It is to be understood that stud 17' is adapted for mounting on a housing (not shown) such as the case 11 of Fig. 2. Springs 55 are crimped as at 56 in order to make them yieldable in a longitudinal direction and they thereby correspond in action to the combination of strips 12 and cantilever springs 13 shown in Figs. 2, 5 and 6. This is a simplified construction which permits uniform response over a fairly wide frequency range and eliminates the built-up spring construction previously described. The stiffness of springs 55 against radial displacements of the seismic mass is sufficient so that undesired contact between the seismic mass and the case of the instrument will not take place under normal operating conditions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a measuring instrument, a mounting, an inertia element displaceable relative thereto and a resilient suspension supporting said element from said mounting and limiting said element to a single degree of freedom, said suspension including a first relatively stiff resilient member and a second resilient member relatively pliable about one principal axis but stiff about other axes, one of said members being supported from said mounting and the other member supporting said element, said two members being joined intermediate said support points and extending in directions making a substantial angle with one another, said suspension being so constructed and arranged that small displacements of said inertia element from a normal position of equilibrium are resisted principally by flexure of said second resilient member about said one principal axis while larger displacements are resisted principally by flexure of said first resilient member, said second member then being principally stressed in tension to apply a force causing flexure of said first member.

2. In a measuring instrument, a housing, a mobile element displaceable to furnish an indication of the measured quantity, a resilient suspension supporting said element from said housing and tending to centralize said element therein, said suspension comprising relatively stiff cantilever springs and relatively pliable thin elongated leaf springs, each of said leaf springs being supported between a pair of said cantilever springs transversely thereto and normally tensioned thereby, springs of one of said two types being supported from said housing and springs of the other type supporting said mobile element, the relative stiffness of said two types of springs being so adjusted that increasing displacement of said element from a central position is resisted by a proportionally increasing force over a wide range.

3. In a measuring instrument, a housing, a sensitive element displaceable relative thereto, a cantilever spring attached to said element, an elongated resilient member adapted to resist longitudinal tension and having unequal stiffness in two lateral directions mounted on said housing and attached at one end to the free end of said cantilever and extending transversely thereto, the relative stiffness of said cantilever and of said elongated member in the more pliable lateral direction being so adjusted that displacement of said element in said pliable direction is resisted by a force proportional to displacement over a relatively wide range of values.

4. A vibration measuring instrument comprising a substantially cylindrical housing, an inertia element, a resilient suspension supporting said element from said housing with but one degree of freedom, said restriction being due to substantially less stiffness of said suspension in the direction of the axis of said housing than in any direction transverse thereto, said suspension comprising, in combination, relatively stiff cantilever springs and relatively pliable thin leaf springs attached to free ends thereof and extending therebetween, springs of one of said types being supported from said housing and springs of the other type supporting said inertia element for applying thereto a restoring force proportional to axial displacement from a position of rest, small displacements being resisted principally by bending of said leaf springs and larger displacements by bending of said cantilever springs.

5. A vibration measuring instrument comprising an inertia element of generally cylindrical form, a cylindrical housing surrounding said element with small radial clearance, viscous liquid substantially filling said housing, a stud axially mounted on said housing, a pair of leaf springs each centrally supported from said stud, a pair of cantilever springs centrally attached to said element, said cantilever and leaf springs being respectively joined at free ends to form a resilient suspension for said element, said springs being so arranged that said suspension has less stiffness in the direction of the housing axis than in any radial direction, a channel in said housing connecting opposite ends thereof to permit the flow of liquid due to displacement of said element, the liquid film between said element and said housing and the flow of liquid in said channel serving to damp free vibrations of the instrument at its natural frequency, and adjustable means for controlling said damping.

6. An accelerometer comprising an inertia element of generally cylindrical form, a cylindrical housing surrounding said element with small radial clearance, viscous liquid substantially filling said housing, a resilient suspension centrally supporting said element within said housing with one degree of freedom, shearing stress in the film of said liquid between said inertia element and housing supplying the principal damping force to motion of said element, and further adjustable damping means, the damping of said instrument as determined by said two damping means being set at substantially six-tenths of critical damping, whereby a response is obtained from said instrument proportional to acceleration over a wide range of values.

7. An accelerometer as claimed in claim 5, in which the adjustable damping means includes a variable obstruction in said channel and temperature controlled means controlling said obstruction.

8. An accelerometer as claimed in claim 5, in which the adjustable damping means includes an adjustable gate in the said channel and manually controlled means for adjusting the degree of obstruction to the flow of damping liquid occasioned by said gate.

9. In an accelerometer comprising a housing and an inertia element displaceable relative to said housing as a measure of acceleration, a resilient suspension supporting said element from said housing for limited displacement along a single axis of the housing, said suspension including a pair of relatively stiff cantilever springs each rigidly attached at one end thereof to said element and a thin pliable leaf spring having opposite ends thereof attached to the free ends of said cantilever springs and normally deflecting said cantilever springs from their unstressed positions thereby to tension said leaf spring, said leaf spring being mounted intermediate the ends thereof on said housing, whereby said leaf spring is caused to act principally as a tension member to apply bending moments to said cantilever springs for all displacements of said inertia element beyond a limited range adjacent the position of equilibrium thereof.

10. Electrical apparatus for measuring vibration, comprising a mounting, an inertia element, a resilient suspension supporting said element on said mounting for limited motion along one axis only of said mounting, a bridge circuit including two halves adapted to be electrically balanced, a pair of coils supported on said mounting and connected in one half of said bridge circuit, means for electrically balancing said circuit, means for applying an operating potential to said circuit, means responsive to a change of a quantity to be measured for unbalancing said circuit when balanced, said last mentioned means comprising a magnetic member movable relative to said coils for differentially changing the impedance thereof in response to change of said quantity whereby to produce an output potential across said circuit proportional to said change, and a pair of electrical means connected respectively in each half of said bridge circuit including means for effecting simultaneous operations thereof to simulate an unbalanced condition of said bridge due to relative motion of said magnetic member and said coils.

11. In a measuring instrument, a mounting and an inertia element, a resilient suspension operatively fastened to said element and to said mounting for supporting said element for movement along the principal axis of said mounting, said suspension comprising two resilient portions connecting each other in zones spaced from their zones of attachment to said element and mounting, a first of said resilient portions being relatively pliable in a direction lengthwise of said principal axis of the housing but offering substantial resistance to flexure in other directions and the second of said resilient portions being relatively stiff but flexible in a direction laterally of the axis of said mounting, the relative stiffness of said second resilient portion in said lateral direction and said first portion in said axial direction being so correlated that displacement of said element in said axial direction is resisted by a force substantially proportional to displacement over a relatively wide range of values.

CHARLES S. DRAPER.
WALTER WRIGLEY.